May 3, 1932.   G. P. SEILER   1,857,067
FRAME FOR MAKING HOOKED RUGS
Filed March 9, 1931
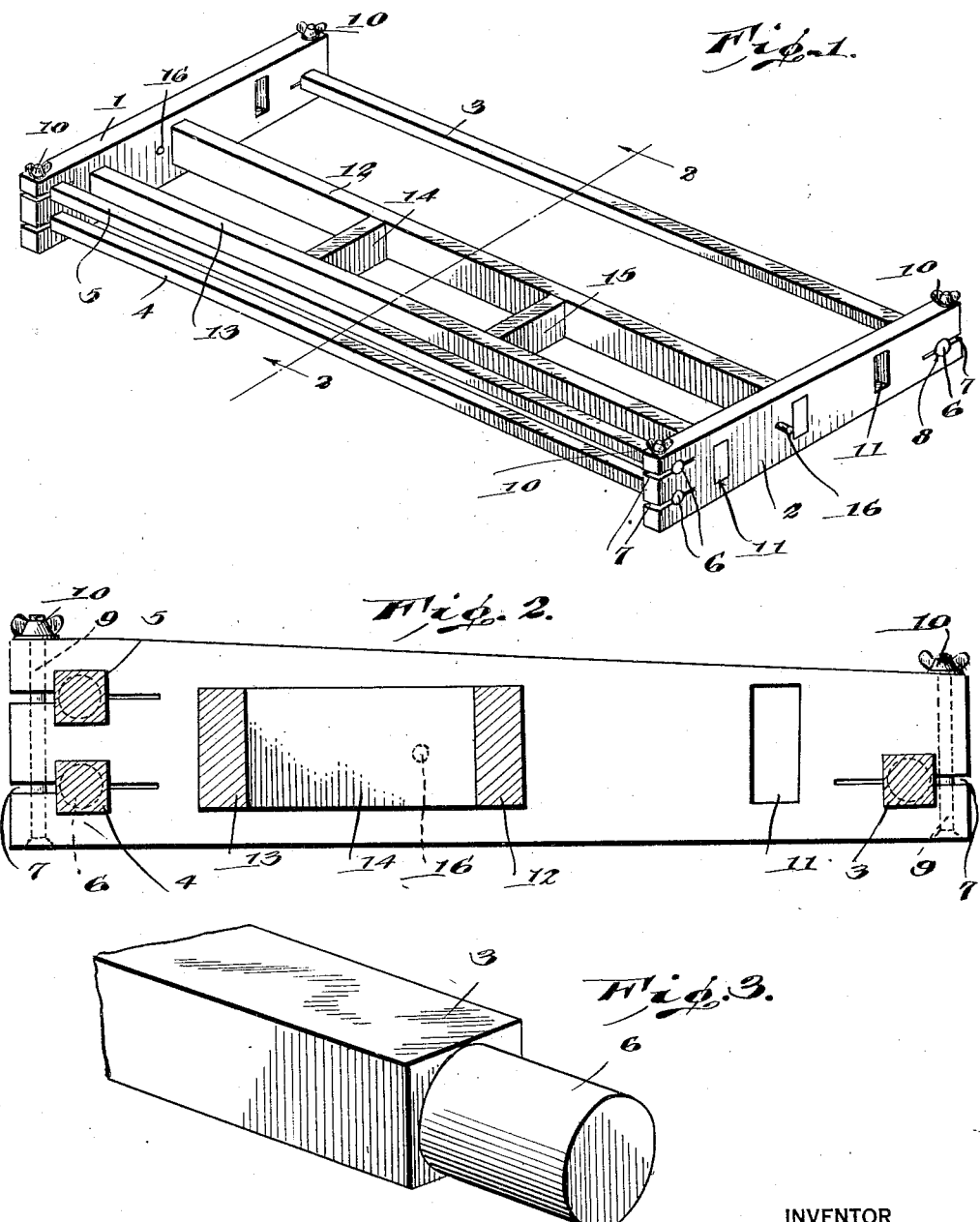
WITNESS
INVENTOR
G. P. Seiler
BY
ATTORNEY Patented May 3, 1932

1,857,067

UNITED STATES PATENT OFFICE

GEORGE P. SEILER, OF NEW ORLEANS, LOUISIANA

FRAME FOR MAKING HOOKED RUGS

Application filed March 9, 1931. Serial No. 521,336.

This invention relates to frames for use in making what are known as "hooked" rugs.

A primary object of the invention is to so construct a frame for use in connection with making rugs of this character that two rugs may be made instead of one without any additional labor and with very little additional cost thereby effecting economy not only in time and labor but in relative amount of outlay.

In carrying out these objects, the invention is susceptible of a wide range of modification without departing from the spirit or sacrificing any of the advantages of the claimed invention; there being shown in the drawings for illustrative purposes a preferred and practical form, in which:

Figure 1 represents a perspective view of a frame embodying this invention;

Fig. 2 is a transverse section taken on the line 2—2 of Fig. 1; and

Fig. 3 is a detail perspective view of the end portion of one of the members of the frame.

In the embodiment illustrated the frame is shown rectangular in form and comprises two end members 1 and 2 connected by detachable side bars 3, 4, and 5, the side bar 3 connecting one end of the end members while the other two side bars 4 and 5 connect the other end of said end bars as is shown clearly in Fig. 1. These side bars are polygonal in cross section throughout the body portion thereof and have rounded ends 6 to facilitate the turning of the bars when desired in bearings formed in said end members. The bearings in the end members 1 and 2 in which these side bars are located are formed by splitting the ends of the end members as shown at 7 and then providing a rounded socket-like bearing 8 for the reception of the round ends 6 which constitute the journals of the side bars. The open slots 7 facilitate the entrance of the side bar journals in their bearings and after they have been entered they are secured in position by means of thumb screws or bolts 9 here shown equipped each with a wing nut 10. These bolts 9 pass edgewise through the end members 1 and 2 and when tightened up hold the side bars against turning. The two side bars 4 and 5 are arranged one above the other in spaced relation for a purpose presently to be described.

The end members 1 and 2 are further provided between the side bars 3 and 4 and 5 with a plurality of oblong openings 11 spaced longitudinally apart extending transversely of these members. Three of these openings 11 are here shown and in two of them are mounted the rug spacing members 12 and 13. These members are shown made in the form of bars or plates and are connected intermediate their ends by spacing or stretching elements 14 and 15 secured in any suitable manner preferably by friction between the bars 12 and 13 and which may be spaced apart any desired distance according to the worker's pleasure.

Mounted in each of the end members 1 and 2 is what may be termed a balance pin 16 for supporting the frame by the end members so that it may be turned according to the convenience of the worker.

When the parts of the frame are assembled as shown in Fig. 2 two pieces of burlap, not shown, from which the rugs are to be constructed are attached to the side bar 3 at one end, one of said pieces being secured to the lower side of said bar and the other to the upper. The piece attached to the lower side is then passed under the bars 12 and 13 and the other end of said burlap strip is attached to the lower side bar 4 on which it is designed to be rolled to produce the necessary tautness in the portion which is extended between bars 3 and 4. The other strip which is attached at one end to the upper face of bar 3 is then passed over the upper edges of bars 12 and 13 and secured in any suitable manner at its other end to the side bar 5 upon which it is rolled to stretch it snugly between said bars 3 and 5 over the pieces 12 and 13. These pieces 12 and 13 as well as those 14 and 15 are thus arranged between the two burlap strips and the uppermost strip has stamped or stenciled thereon the design of the rug to be made. The width of the bars or strips 12 and 13 and those 14 and 15 determine the length or depth of the pile of the rugs after they have been cut apart.

In the use of this frame the worker using the proper yarn and a selected needle weaves the design through both pieces of burlap properly following the pattern on the top piece and works until the pattern is completed for the full size of the rug desired. The completed work is then removed from the frame, seized on both sides and carefully cut through the exact center of the yarn which connects the two rugs. This separation will leave two properly made rugs of similar design. It will thus be seen that there is no more work entailed to make two rugs than there would be to make one and in fact the only additional outlay will be for the extra piece of burlap and for a small additional quantity of yarn.

I claim:

1. A frame for making pairs of "hooked" rugs simultaneously comprising a pair of spaced end bars, a side bar connecting similarly disposed ends of the end bars together, a pair of side bars connecting the other ends of the end bars together, a pair of parallel spacing bars supported by the end bars and located between the first-mentioned side bar and the second-mentioned side bars and spacing blocks frictionally held between the bars in parallel spaced relation.

2. A frame for making pairs of "hooked" rugs simultaneously comprising a pair of spaced end bars, a side bar connecting similarly disposed ends of the end bars together, a pair of side bars connecting the other ends of the end bars together, a pair of parallel spacing bars supported by the end bars and located between the first-mentioned side bar and the second-mentioned side bars and spacing blocks frictionally held between the bars in parallel spaced relation, the end bars having means to support one of the spacing bars in a different position, the lower edges of the spacing bars being substantially in a horizontal plane which passes through the lower edges of a pair of the oppositely disposed side bars at opposite sides of the frame.

GEO. P. SEILER.